US007293620B2

(12) United States Patent
Chao

(10) Patent No.: US 7,293,620 B2

(45) Date of Patent: Nov. 13, 2007

(54) FRONT WHEEL STABILIZING DEVICE FOR AN ELECTRIC MOTOR-DRIVEN WHEELED VEHICLE

(76) Inventor: Ya-Chen Chao, No. 140, Kung-Yeh 11th Rd., Ta-Li Industrial Park, Ta-Li City, Taichung Hsien (TW)

( * ) Notice: Subject to any disclaimer, the term of this patent is extended or adjusted under 35 U.S.C. 154(b) by 171 days.

(21) Appl. No.: 11/284,715

(22) Filed: Nov. 22, 2005

(65) Prior Publication Data

US 2007/0114079 A1 May 24, 2007

(51) Int. Cl.
*B62D 61/12* (2006.01)

(52) U.S. Cl. .................. 180/65.1; 180/907; 280/304.1; 280/250.1

(58) Field of Classification Search ............... 180/65.1, 180/907, 209, 22, 24.02, 15, 16, 91.1, 19.2, 180/24.13; 280/304.1, 43, 250.1, 293, 301, 280/767, 764.1
See application file for complete search history.

(56) References Cited

U.S. PATENT DOCUMENTS

| | | | | |
|---|---|---|---|---|
| 4,385,769 | A * | 5/1983 | Molino | 280/47.38 |
| 5,848,658 | A * | 12/1998 | Pulver | 180/65.1 |
| 5,944,131 | A * | 8/1999 | Schaffner et al. | 180/65.1 |
| 6,070,898 | A * | 6/2000 | Dickie et al. | 280/304.1 |
| 6,073,951 | A * | 6/2000 | Jindra et al. | 280/304.1 |
| 6,176,335 | B1 * | 1/2001 | Schaffner et al. | 180/65.1 |
| 6,460,641 | B1 * | 10/2002 | Kral | 180/24.02 |
| 6,640,916 | B2 * | 11/2003 | Schaffner et al. | 180/65.1 |
| 6,752,230 | B1 * | 6/2004 | Huang | 180/209 |

* cited by examiner

*Primary Examiner*—J. Allen Shriver
*Assistant Examiner*—Bridget Avery
(74) *Attorney, Agent, or Firm*—Day Pitney LLP

(57) ABSTRACT

A front wheel stabilizing device includes a mount adapted to be secured to a main frame of an electric motor-driven wheeled vehicle, and an axle disposed between two side plates of the mount. A wheel mounting member has a tubular head which is rotatably sleeved on the axle, and a cantilever arm which extends from the tubular head forwardly to terminate at a wheel-carrying end for mounting a stabilizing wheel thereon. The stabilizing wheel can yield under a jolting force that arises as a result of movement of the stabilizing wheel over an uneven ground so as to displace from a more tractive position to a less tractive position. A torsion spring has a coiled segment which is wound on the tubular head, and two urging ends which abut against the mount and the cantilever arm, respectively, so as to bias the stabilizing wheel downwardly, thereby restoring the stabilizing wheel from the less tractive position back to the more tractive position.

8 Claims, 11 Drawing Sheets

FRONT WHEEL STABILIZING DEVICE FOR AN ELECTRIC MOTOR-DRIVEN WHEELED VEHICLE

BACKGROUND OF THE INVENTION

1. Field of the Invention

This invention relates to a front wheel stabilizing device for an electric motor-driven wheeled vehicle, more particularly to a front wheel stabilizing device to prevent tipping of the wheeled vehicle.

2. Description of the Related Art

A conventional electric motor-driven wheelchair is generally provided with a front wheel stabilizing device to improve tracking upon undulating or irregular surfaces and to provide anti-tip stability. FIGS. 1 and 2 show an electric power wheelchair 10 disclosed in Taiwanese patent publication No. 370866. The wheelchair 10 includes a main frame 11, two front drive wheels 12 mounted proximate to a front side of the main frame 11, two rear caster wheels 13 mounted on a rear aide of the main frame 11, and a footrest 14 and two front stabilizing devices 15 mounted on the front side of the main frame 11.

Each of the front stabilizing devices 15 includes a support rod 151 which extends through an insert hole 112 formed in a front upright post 111 of the main frame 11 and which is secured to the front upright post 111 by means of screw fasteners 16 that extend through lock holes 113 formed in the front upright post 111, a cantilever arm 152 which is pivotally mounted on the front upright post 111, a stabilizing wheel 153 which is mounted on the cantilever arm 152, and a compression spring 154 which is disposed between a front segment 1511 of the support rod 151 and the cantilever arm 152.

Due to the provision of the front stabilizing devices 15, when the wheelchair 10 travels over undulating or irregular surfaces, the compression springs 487 provide a damper effect to the cantilever arms 152 and the stabilizing wheels 153 so as to improve anti-tip stability. However, the upright posts 111 need to be formed with the insert holes 112 for passage of the support rods 151, and the lock holes 113 for securing the support rods 151 to the upright posts 111, thereby resulting in weakening of the structure of the main frame 11 and complicating the manufacturing process. Moreover, as the front segments 1511 of the support rods 151 extend forwardly of the main frame 11 for the compression springs 154 to be mounted thereon, they are liable to be damaged as well as unsightly.

U.S. Pat. Nos. 5,848,658 and 6,460,641 also disclose electric power wheelchairs, which, however, suffer from the aforesaid drawbacks as well.

SUMMARY OF THE INVENTION

The object of the present invention is to provide a front wheel stabilizing device which can be assembled conveniently to a main frame of an electric motor-driven wheeled vehicle without weakening the structure of the main frame, and which has an improved anti-tipping stability.

According to this invention, the front wheel stabilizing device includes a mount adapted to be secured to a front side of a main frame of an electric motor-driven wheeled vehicle, and having two side plates which are spaced apart from each other in a transverse direction. An axle is disposed between the side plates, and extends along a pivot axis in the transverse direction to interconnect the side plates. A wheel mounting member has a tubular head which is sleeved on and which is rotatable relative to the axle about the pivot axis, and a cantilever arm which extends from the tubular head forwardly to terminate at a wheel-carrying end. A stabilizing wheel is rollably mounted on the wheel-carrying end to be rollable about a stabilizing wheel axis parallel to the pivot axis, and can yield under a jolting force that arises as a result of movement of the stabilizing wheel over an uneven ground surface so as to displace from a more tractive position, where the stabilizing wheel travels with more traction, to a less tractive position. A torsion spring has a coiled segment which is wound on the tubular head about the pivot axis, and two urging ends which are connected to opposite sides of the coiled segment, and which abut against the mount and the cantilever arm, respectively, so as to bias the stabilizing wheel downwardly, thereby restoring the stabilizing wheel from the less tractive position back to the more tractive position.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
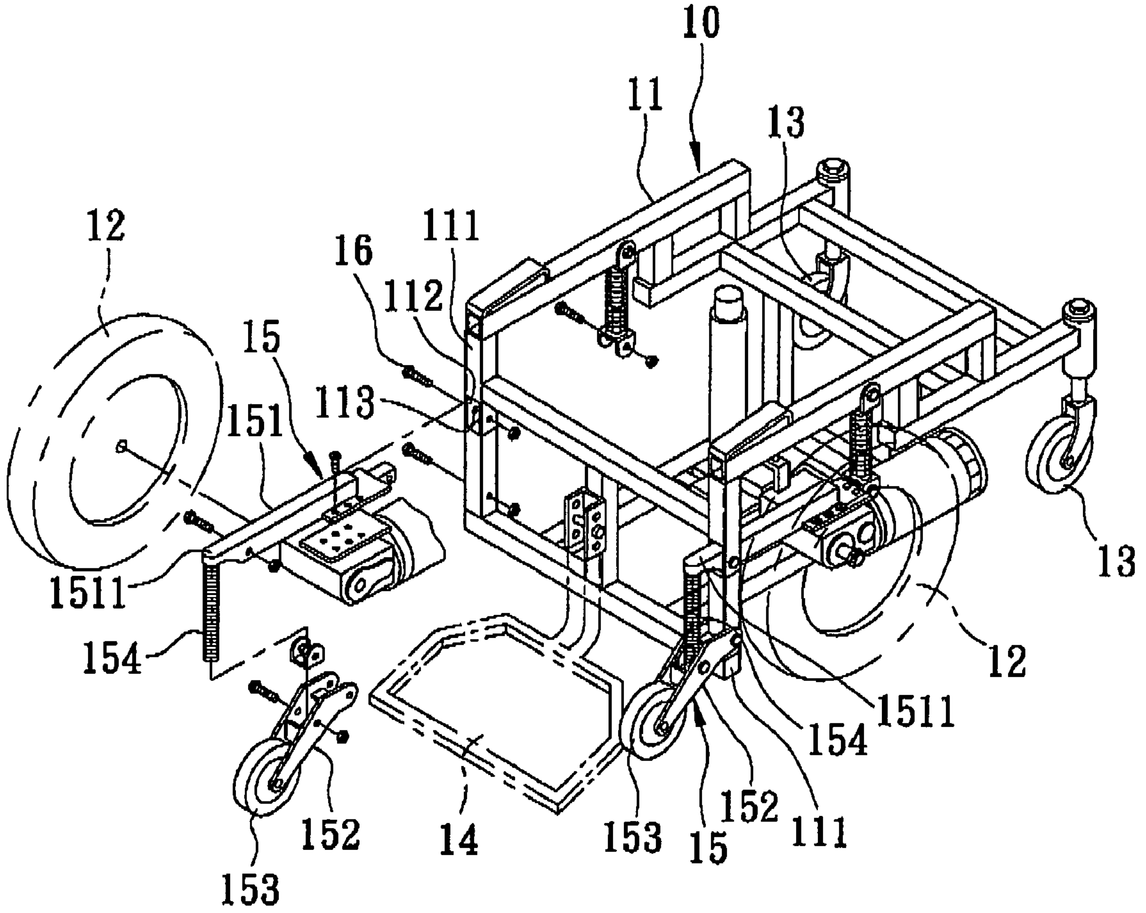
FIG. 1 PRIOR ART
FIG. 1 is an exploded perspective view of a conventional electric power wheelchair in part.
Figure 2:
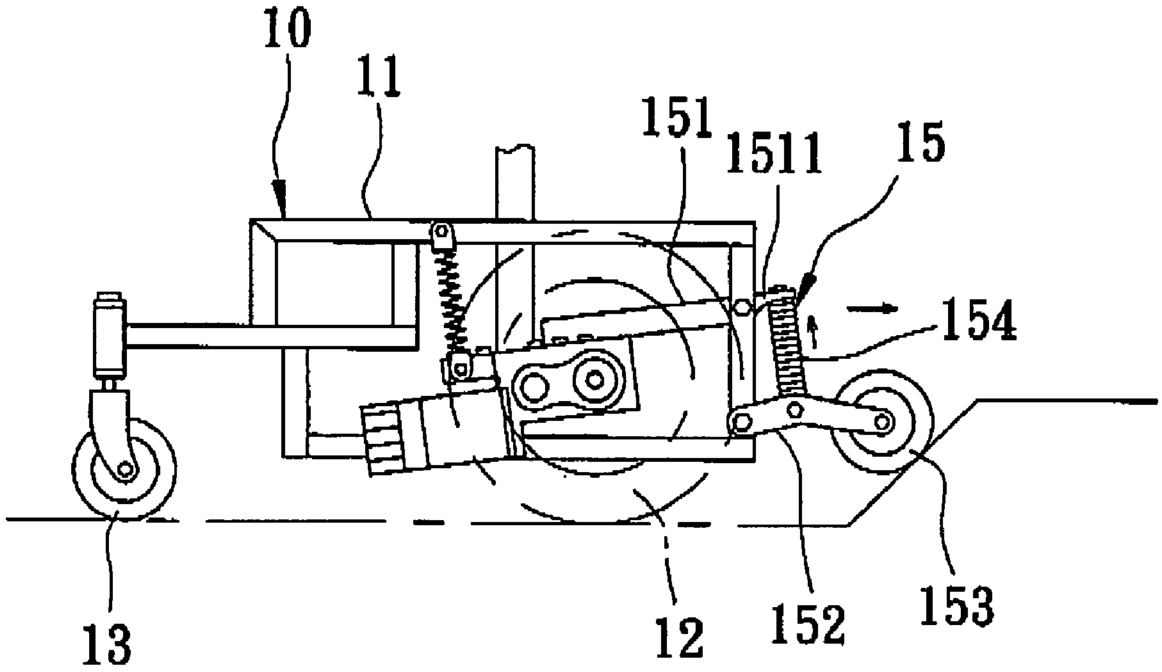
FIG. 2 PRIOR ART
FIG. 2 is a schematic side view of the conventional electric power wheelchair in use.
Figure 3:
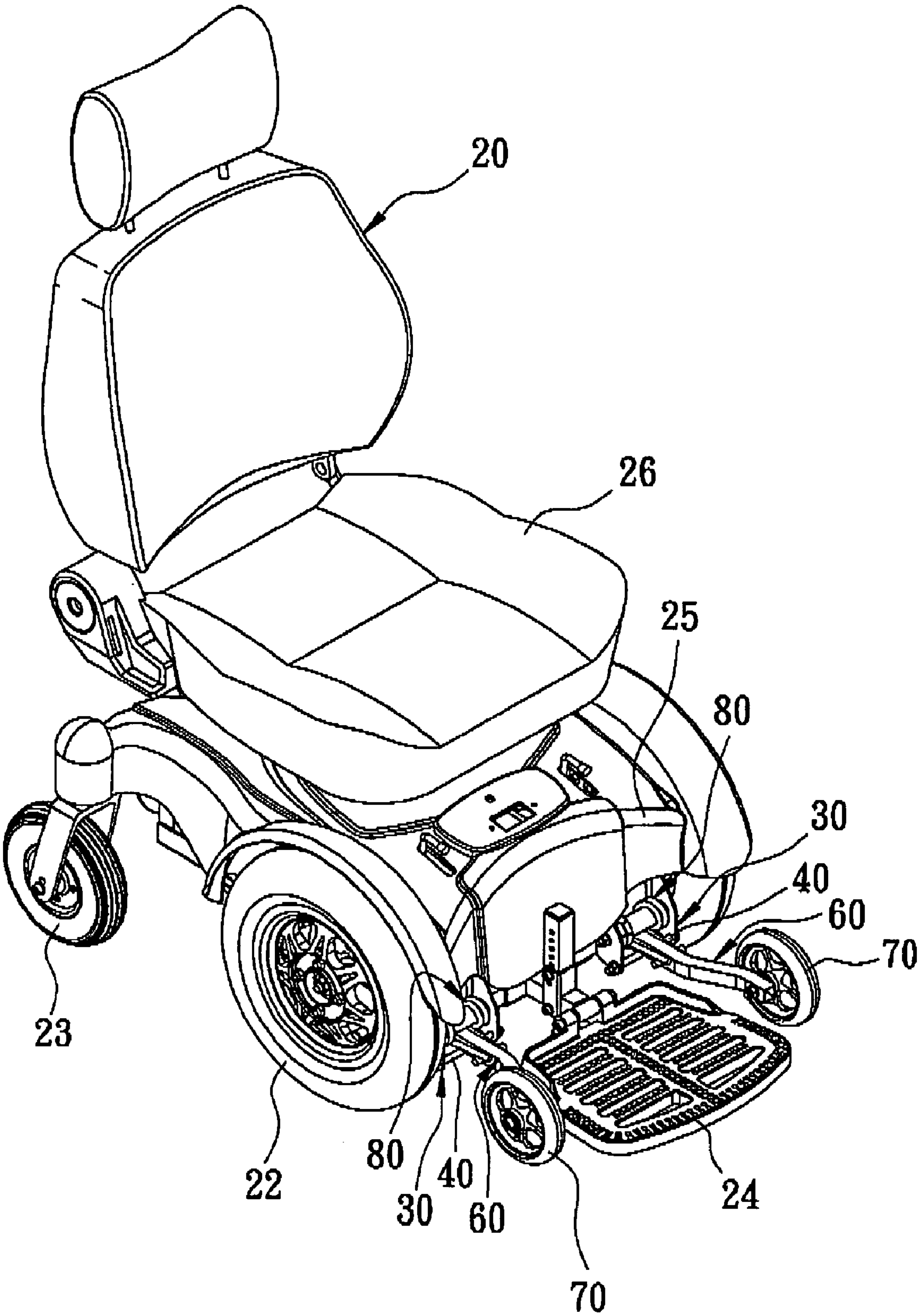
FIG. 3 is a perspective view of the preferred embodiment of a front stabilizing device according to this invention when assembled to an electric motor-driven wheeled vehicle.
Figure 4:
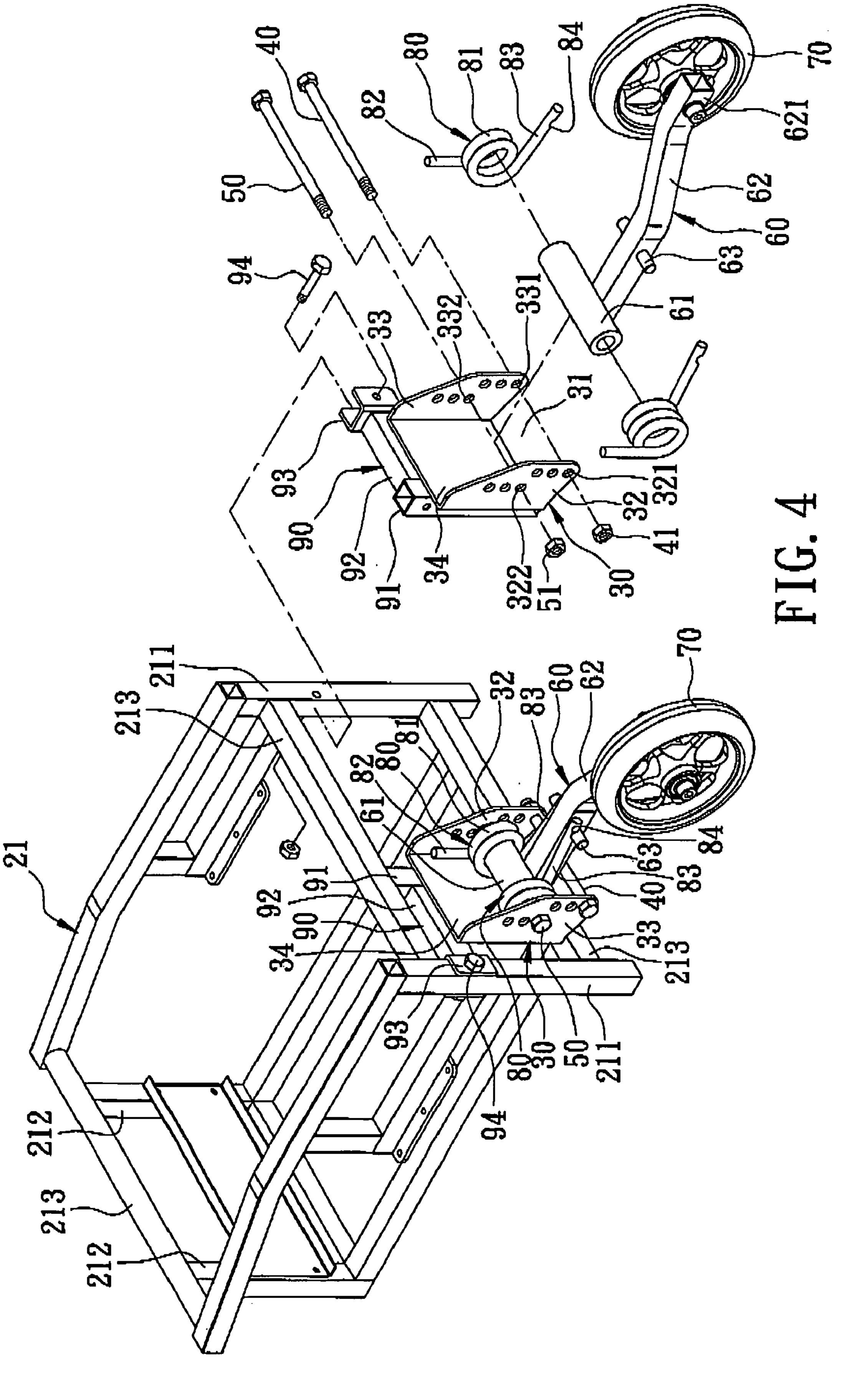
FIG. 4 is an exploded perspective view of the preferred embodiment and a main frame of the electric motor-driven wheeled vehicle.

Referring to FIGS. 3 and 4, the preferred embodiment of a front wheel stabilizing device according to the present invention is adapted to be assembled to an electric motor-driven wheeled vehicle 20, such as an electric power-driven wheelchair. The wheeled vehicle 20 has a main frame 21 for supporting a vehicle seat 26 thereon, a pair of front drive wheels 22 mounted proximate to a front side of the main frame 21 to be rotatable relative thereto about a driving wheel axis in a transverse direction for propelling the wheeled vehicle 20 along a ground surface, a pair of rear caster wheels 23 mounted to a rear side of the main frame 21, and a footrest 24 mounted on the front side of the main frame 21. The main frame 21 includes a pair of front upright posts 211, a pair of rear upright posts 212, and a plurality of crossbars 213 interposed between the front upright posts 211 and the rear upright posts 212. A shell 25 is disposed to cover the main frame 21.

Figure 5:
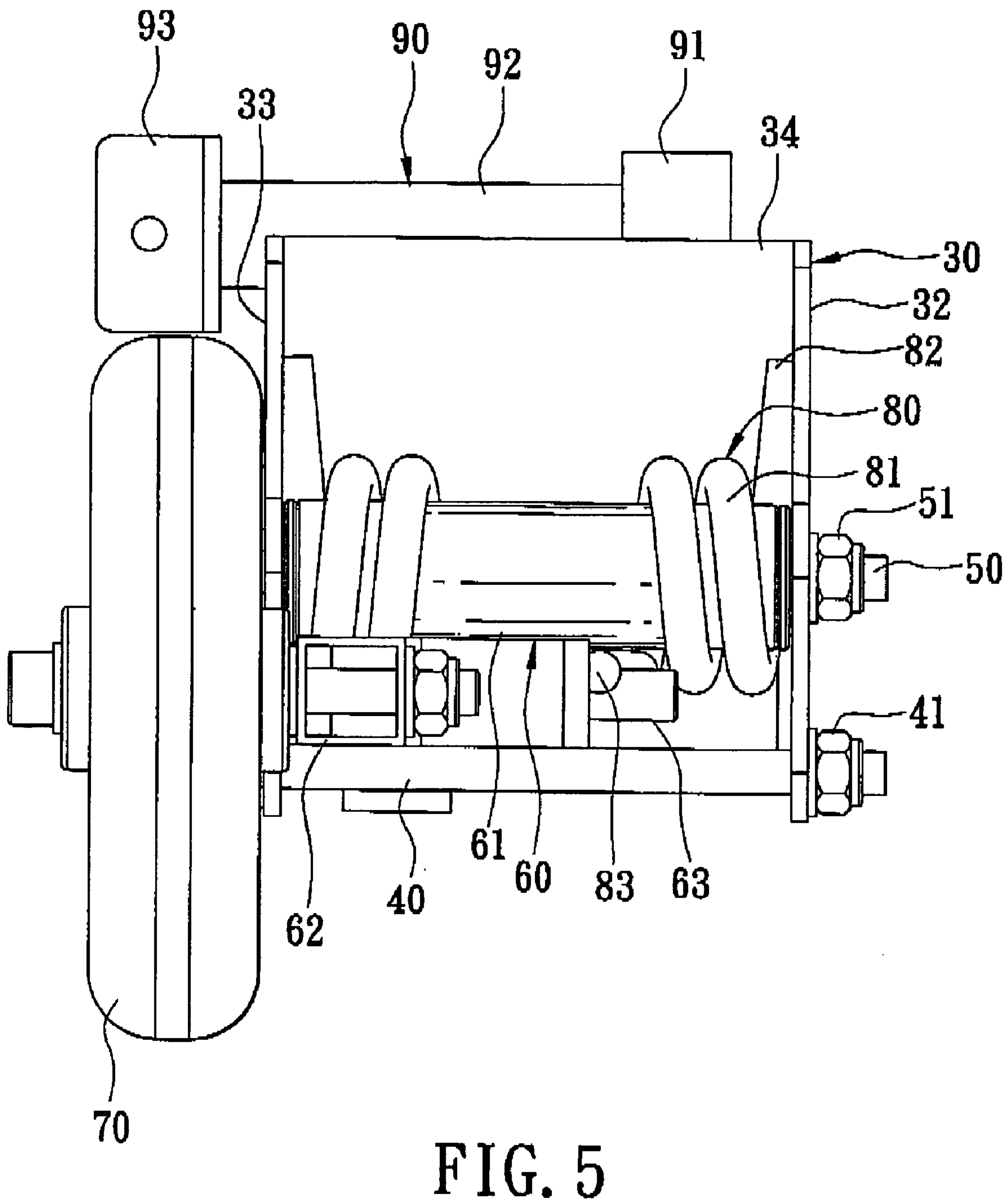
FIG. 5 is a schematic front view showing the front stabilizing device assembled to the electric motor-driven wheeled vehicle.
Figure 6:
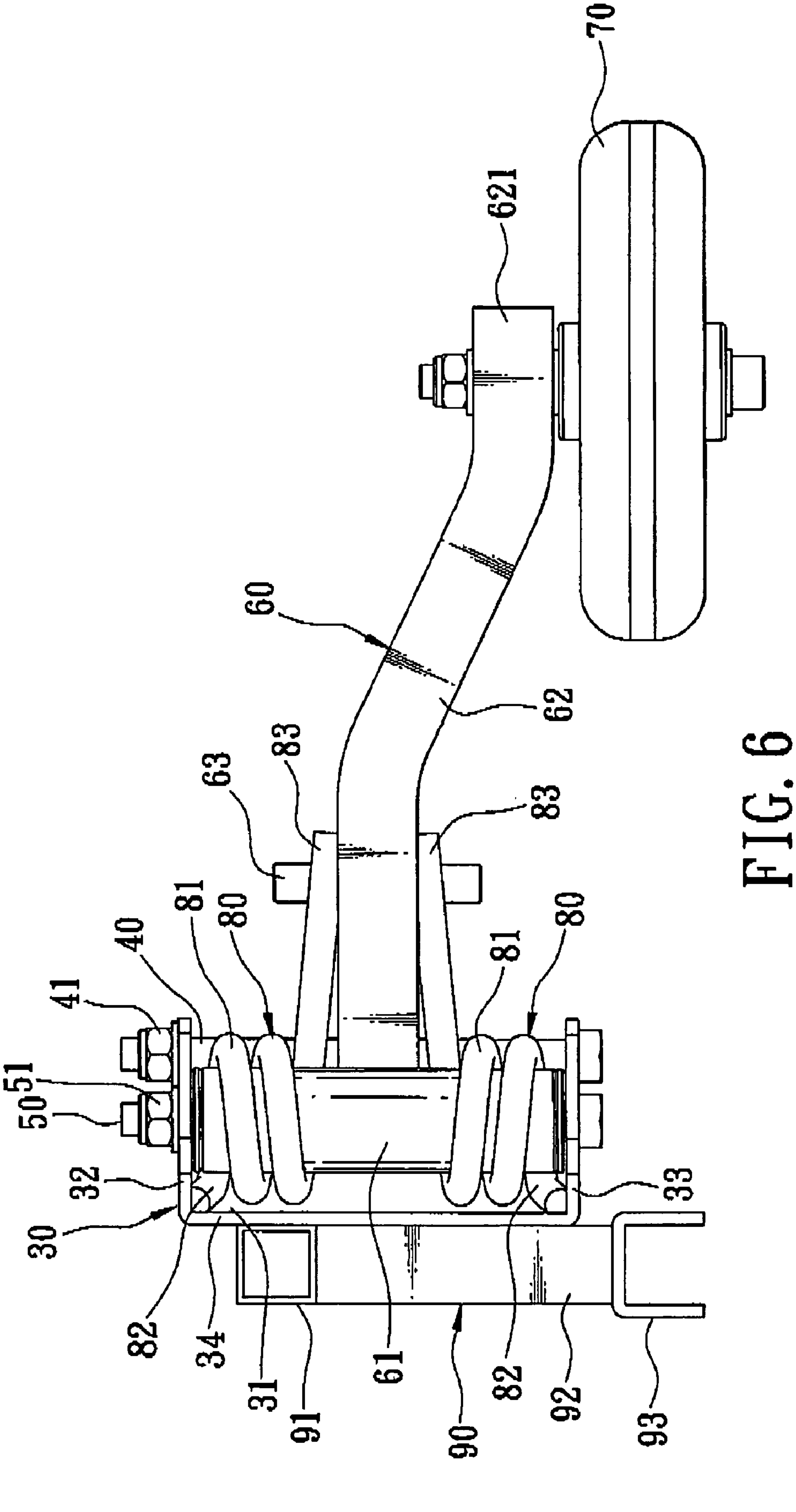
FIG. 6 is a schematic top view showing two torsion springs mounted on a wheel mounting member of the front wheel stabilizing device.

With further reference to FIGS. 4 to 6, the front wheel stabilizing device of this embodiment is shown to comprise a mount 30, a support rod 40, an axle 50, a wheel mounting member 60, a stabilizing wheel 70, two torsion springs 80, and a coupling member 90. In use, two sets of the front wheel stabilizing devices of this embodiment are preferably assembled to the wheeled vehicle 20, and are juxtaposed in the transverse direction.

The mount 30 has two side plates 32, 33 which are spaced apart from each other in the transverse direction to define a receiving space 31 therebetween, and a back plate 34 which is interposed between and which is disposed rearwardly of the sideplates 32, 33. The sideplates 32, 33 have a plurality of pairs of first mounting holes 321, 331, each pair of which are aligned with each other in the transverse direction, and a plurality of pairs of second mounting holes 322, 332, each pair of which are aligned with each other in the transverse direction.

The support rod 40 is disposed in the receiving space 31. In this embodiment, the support rod 40 is in the form of a threaded rod, and extends through a selected one pair of the first mounting holes 321, 331 to be engaged threadedly with a screw nut 41 so as to be secured to the mount 30.

The axle 50 is disposed in the receiving space 31, and extends upwardly and rearwardly of the support rod 40. In this embodiment, the axle 50 is in the form of a threaded rod, and extends along a pivot axis in the transverse direction through a selected one pair of the second mounting holes 322, 332 to be engaged threadedly with a screw nut 51 so as to be secured to the mount 30.

The wheel mounting member 60 has a tubular head 61 which is sleeved on and which is rotatable relative to the axle 50 about the pivot axis, a cantilever arm 62 which extends from the tubular head 61 forwardly to terminate at a wheel-carrying end 621, and a pair of stems 63 which are disposed on and which extend from the cantilever arm 62. The cantilever arm 62 is disposed above and is supported by the support rod 40 so as to restrain excess downward movement of the stabilizing wheel 70.

The stabilizing wheel 70 is rollably mounted on the wheel-carrying end 621 to be rollable about a stabilizing wheel axis parallel to the pivot axis, and can yield under a jolting force that arises as a result of movement of the stabilizing wheel 70 over an uneven ground surface so as to displace from a more tractive position, where the stabilizing wheel 70 travels with more traction, to a less tractive position.

Each of the torsion springs 80 has a coiled segment 81 which is wound on the tubular head 61 about the pivot axis, and two urging ends 82, 83 which are connected to opposite sides of the coiled segment 81. The urging end 83 has a concave portion 84 which is configured for mounting on and abutting against the stem 63. The urging end 82 is disposed to abut against the back plate 34 so as to bias the stabilizing wheel 70 downwardly, thereby restoring the stabilizing wheel 70 from the less tractive position back to the more tractive position.

The coupling member 90 includes an upright post 91 which is mounted securely on the back plate 34 and which is adapted to be secured on one of the crossbars 213, e.g., by soldering, a crossbar 92 which is connected to and which extends from the upright post 91 in the transverse direction, and a lock seat 93 which is disposed on an end edge of the crossbar 92 and which extends laterally of the side plate 32 or 33, and a fastener 94 which is disposed to secure the lock seat 93 on the respective front upright post 211. By means of the coupling member 90, the mount 30 can be assembled to the front side of the main frame 21 conveniently without weakening the structure of the main frame 21.

Figure 7:
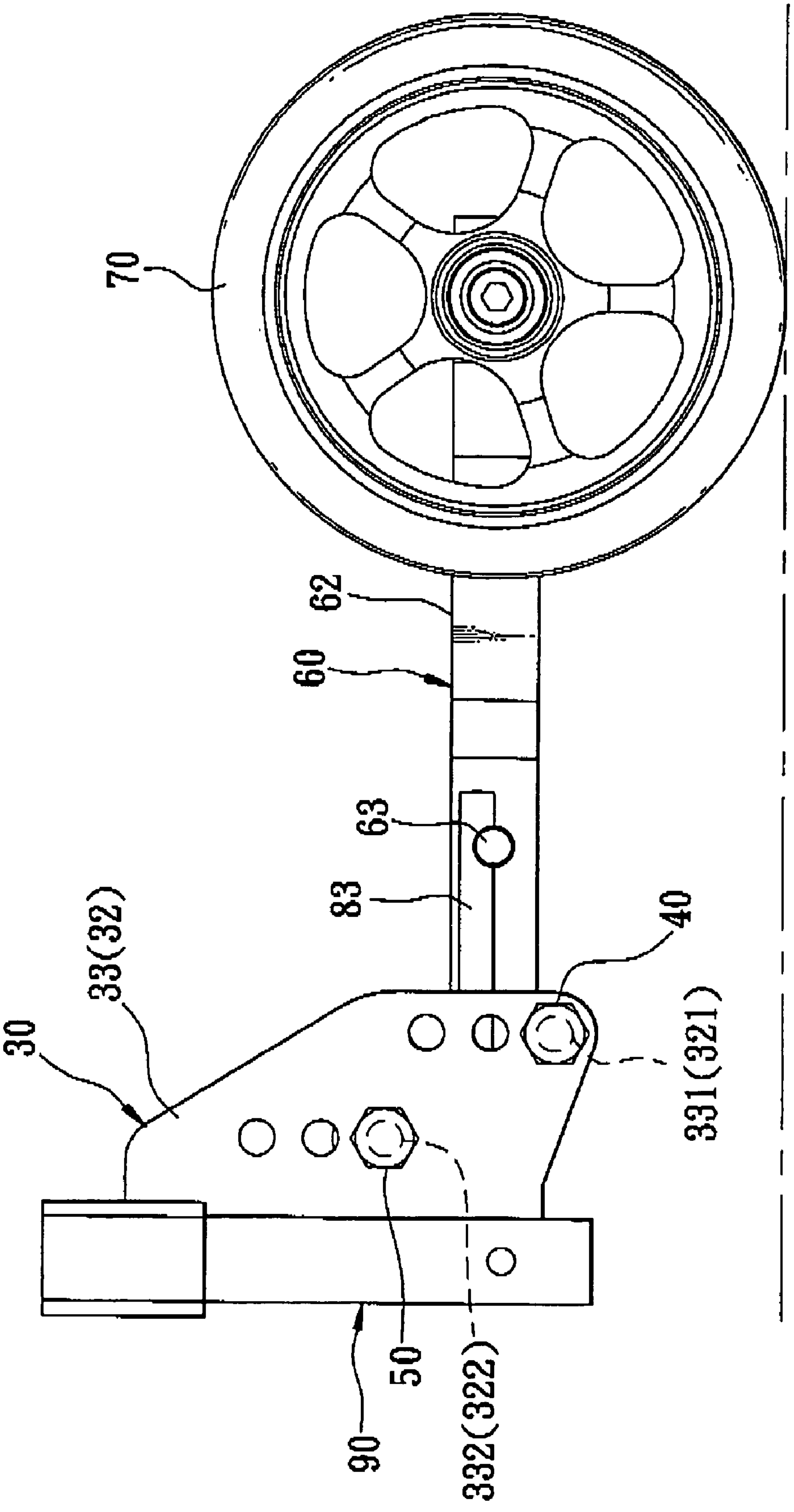
FIG. 7 is a schematic side view showing the wheel mounting member placed in a substantially parallel state.
Figure 8:
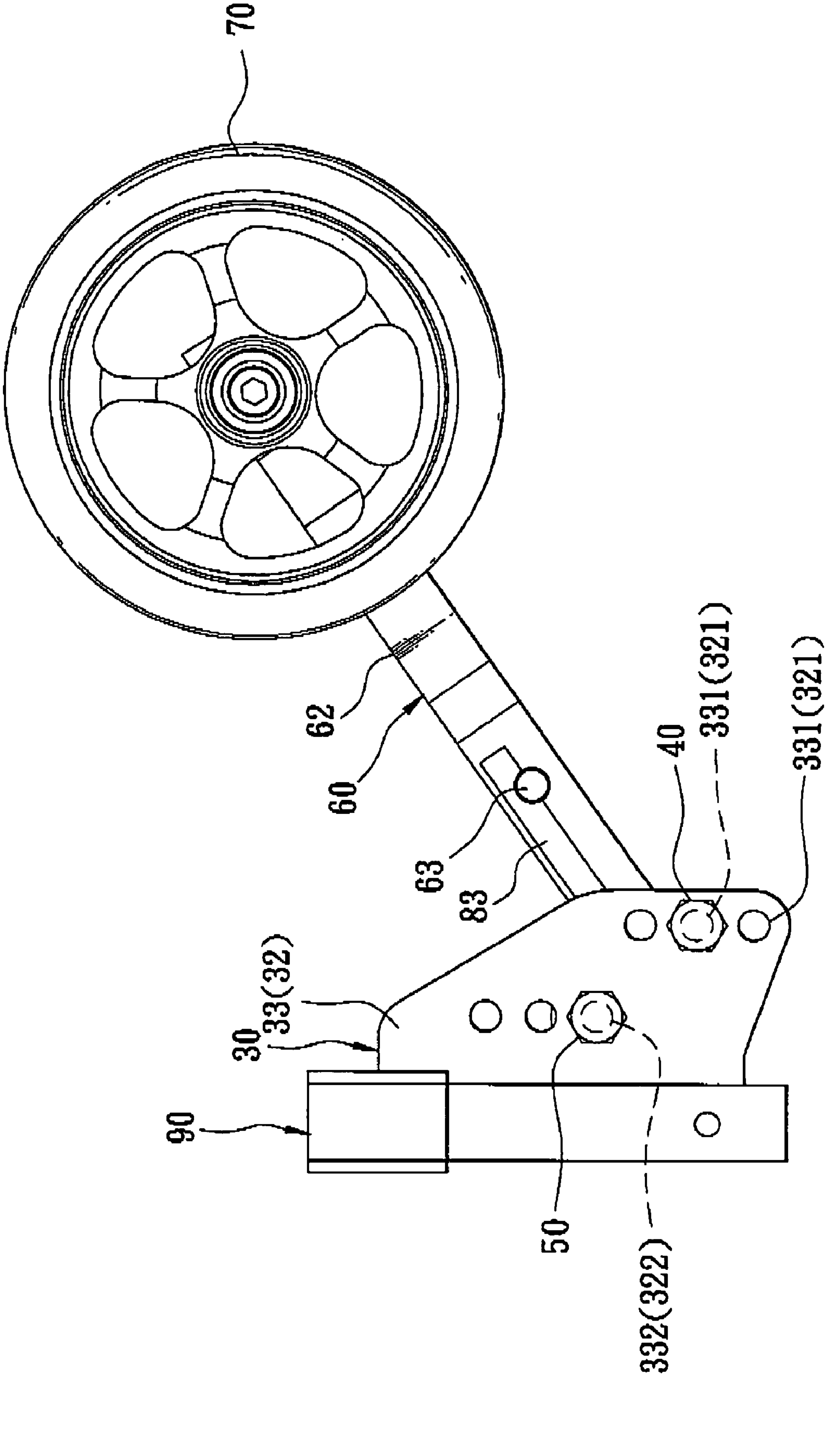
FIG. 8 is a view similar to FIG. 7, but showing the wheel mounting member placed in a lifted state.
Figure 9:
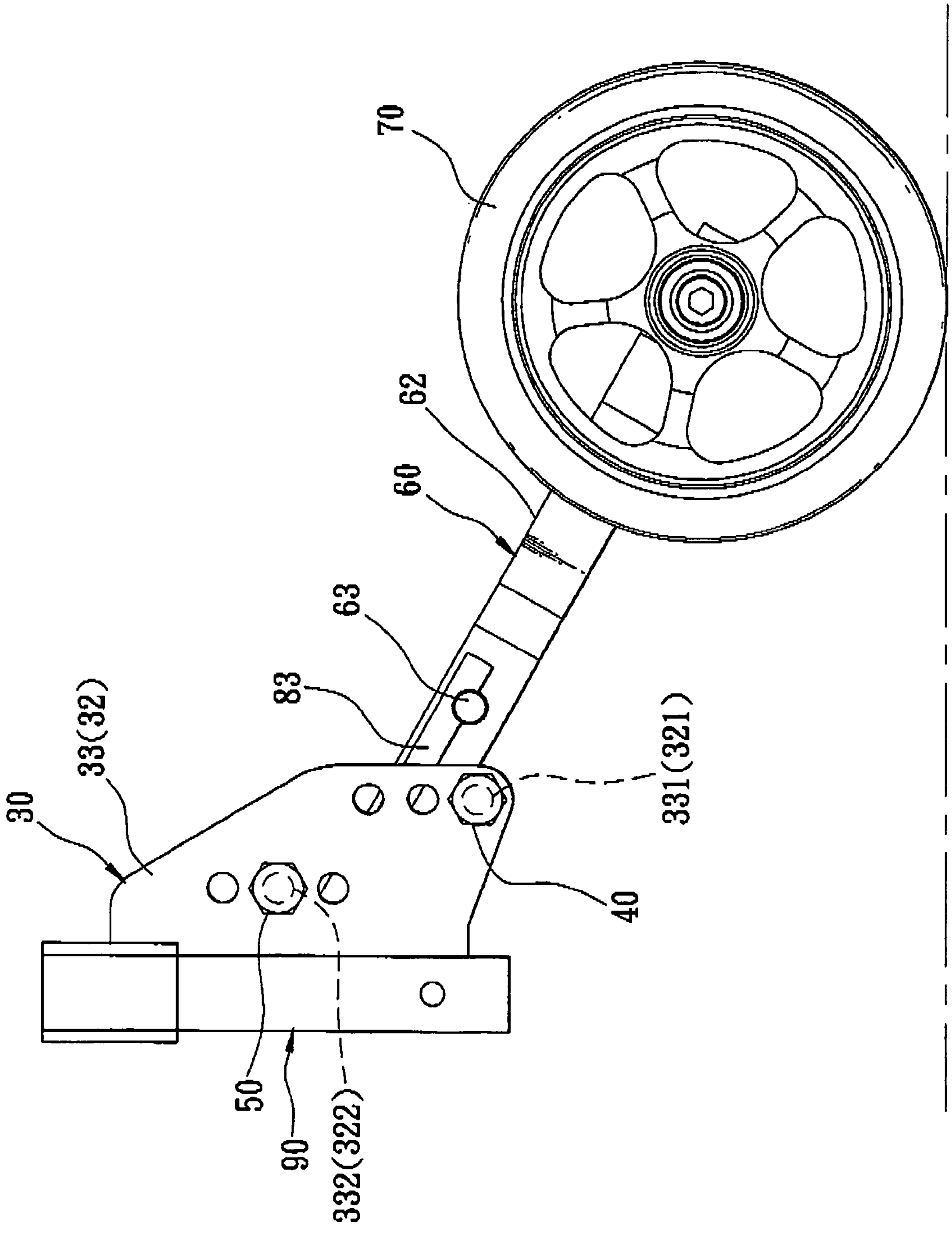
FIG. 9 is a view similar to FIG. 7, but showing the wheel mounting member placed in a lowered state.

In use, the angular position of the wheel mounting member 60 is adjustable. FIG. 7 shows the wheel mounting member 60 in a substantially parallel position. Specifically, the support rod 40 extends through the lowest ones of the first mounting holes 321, 331, and the axle 50 extends through the lowest ones of the second mounting holes 322, 332 such that the cantilever arm 62 is kept parallel to the ground surface. As shown in FIG. 8, when the support rod 40 extends through the upper ones of the first mounting holes 321, 331, the cantilever arm 62 is kept in a lifted position relative to a horizontal ground surface. As shown in FIG. 9, when the axle 50 extends through the upper ones of the second mounting holes 322, 332, the cantilever arm 62 is kept in a lowered position relative to the horizontal ground surface. Therefore, by adjusting the height of the support rod 50 and/or the axle 50 relative to the mount 30, the angular position of the cantilever arm 62 can be conveniently adjusted so as to match the relationship between the stabilizing wheels 70 and the ground surface, the dimension of the wheeled vehicle 20, the user's weight, etc. For example, the front wheel stabilizing device shown in FIG. 8 is preferably used when the wheeled vehicle 20 frequently travels uphill. The front wheel stabilizing device shown in FIG. 7 or 9 is preferably used when the wheeled vehicle 20 frequently travels on a horizontal ground surface.

Figure 10:
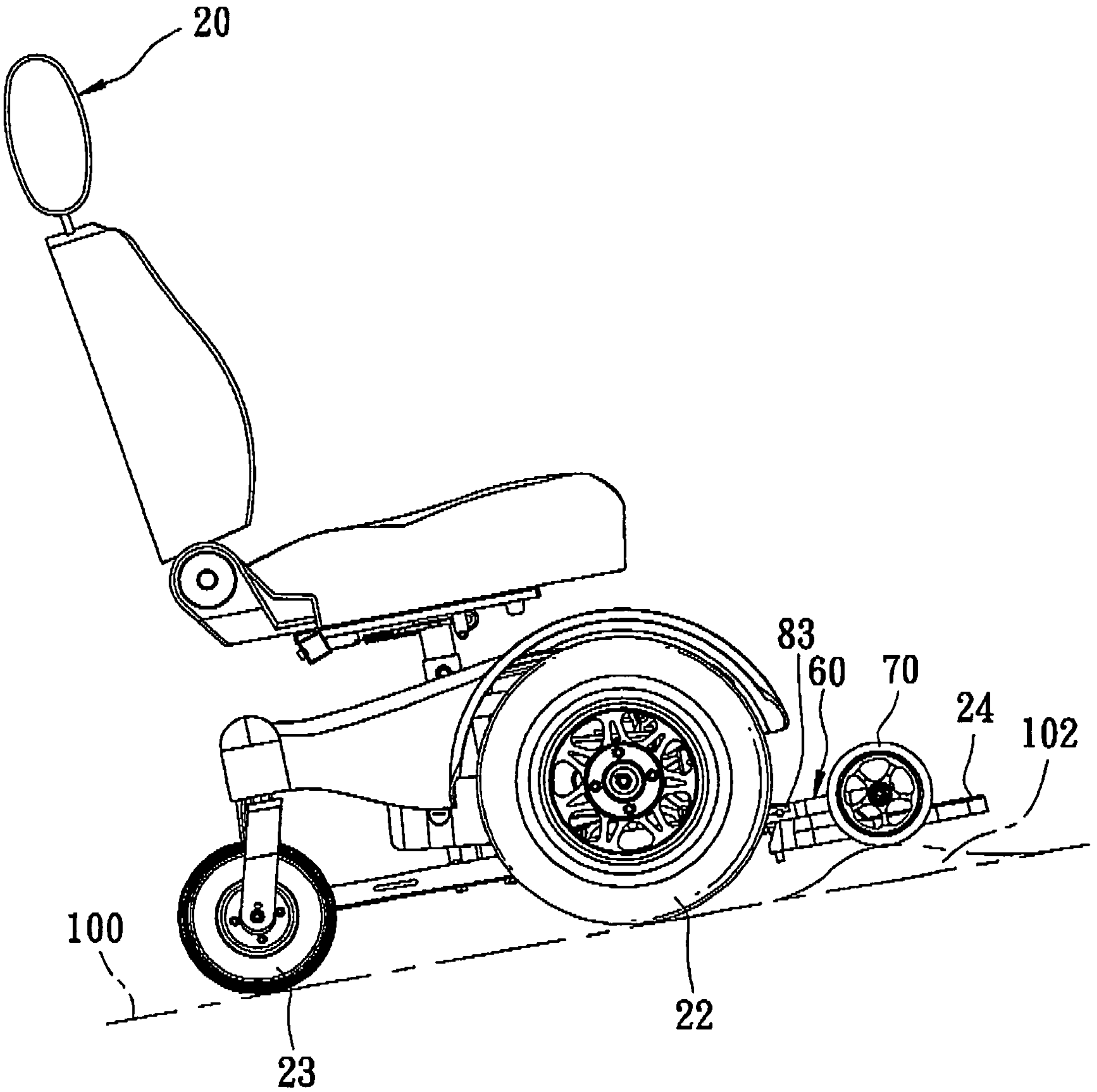
FIG. 10 is a schematic view showing the electric motor-driven wheeled vehicle incorporating the front wheel stabilizing device of this invention when traveling uphill.
Figure 11:
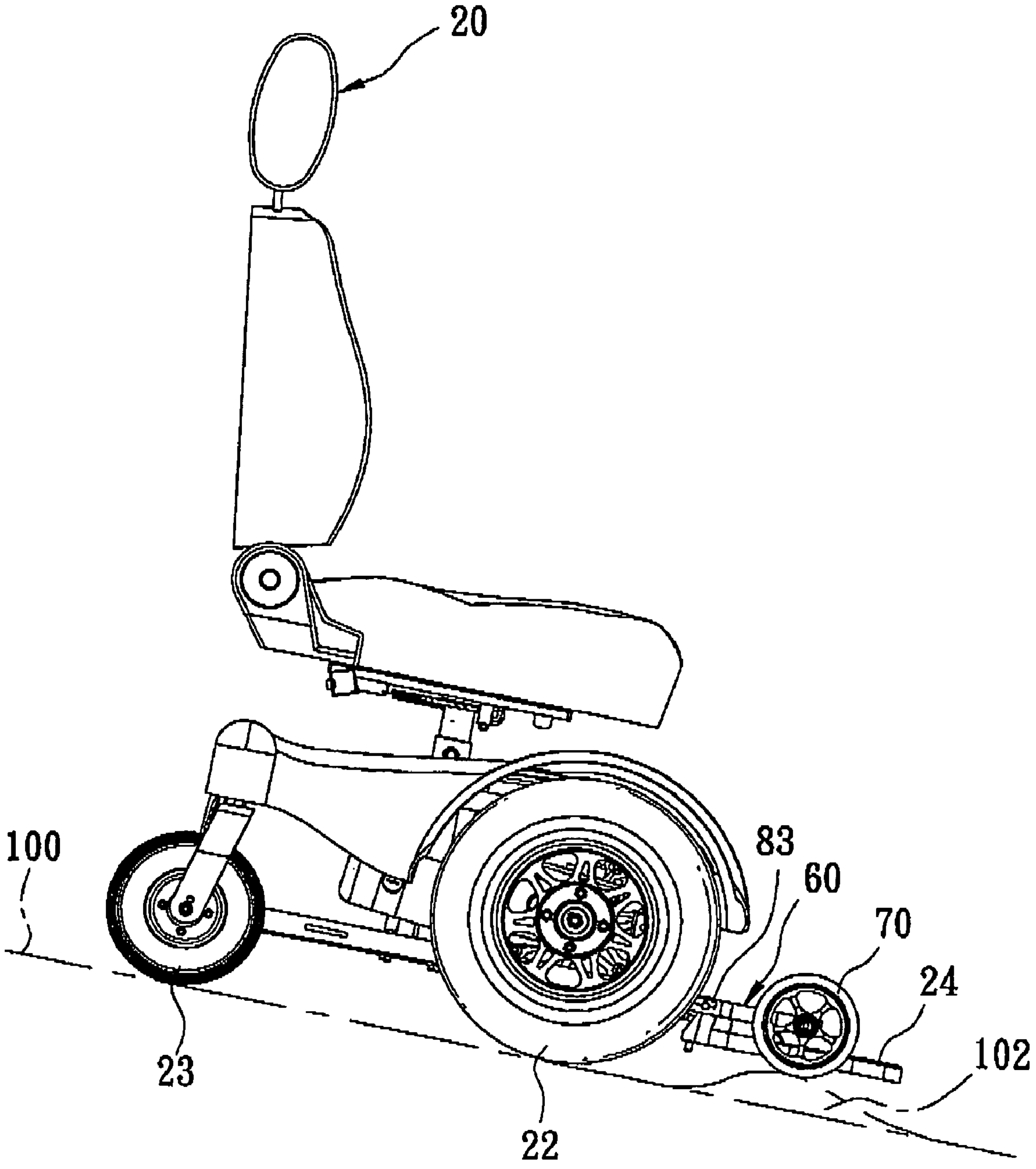
FIG. 11 is a schematic view showing the electric motor-driven wheeled vehicle incorporating the front wheel stabilizing device of this invention when traveling downhill.

By means of the torsion springs 80 which can bias the cantilever arm 62 and the stabilizing wheel 70 downwardly, the stabilizing wheel 70 can yield under a jolting force to displace to a more or less tractive position, thereby providing an anti-tipping effect. Hence, as shown in FIGS. 10 and 11, when the wheeled vehicle 20 travels on an uphill road surface 100, a downhill road surface 101, or an uneven road surface 102, the stabilizing wheel 70 can yield under a jolting force to steadily move along the contour of the road surface so as to prevent the wheeled vehicle 20 from tipping.

It is noted that the torsion springs 80, unlike the compression or tension springs used in prior art, can provide a steady and even biasing force to the cantilever arm 62 during traveling of the wheeled vehicle 20, thereby improving the anti-tipping effect of the stabilizing wheel 70. Moreover, the number of the torsion springs 80 can be varied, i.e., the front wheel stabilizing device of this invention can include only one torsion spring 80.

According to this invention, the mount 30 can be assembled onto the main frame 21 of the wheeled vehicle 20 through the coupling member 90. Therefore, the assembling operation is convenient to conduct and will not adversely affect the structure of the main frame 21. Moreover, as the torsion springs 80 and the tubular head 61 are accommodated within the shell 25, they are not liable to be damaged.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A front wheel stabilizing device for an electric motor-driven wheeled vehicle, the wheeled vehicle having a main frame for supporting a vehicle seat thereon, and a pair of front drive wheels mounted proximate to a front side of the main frame to be rotatable relative thereto about a driving wheel axis in a transverse direction for propelling the wheeled vehicle along a ground surface, said front wheel stabilizing device comprising:

a mount adapted to be secured to the front side of the main frame, and having two side plates which are spaced apart from each other in the transverse direction;

an axle disposed between said side plates, and extending along a pivot axis in the transverse direction to interconnect said side plates;

a wheel mounting member having a tubular head which is sleeved on and which is rotatable relative to said axle about the pivot axis, and a cantilever arm which extends from said tubular head forwardly to terminate at a wheel-carrying end;

a stabilizing wheel which is rollably mounted on said wheel-carrying end to be rollable about a stabilizing wheel axis parallel to the pivot axis, and which can yield under a jolting force that arises as a result of movement of said stabilizing wheel over an uneven ground surface so as to displace from a more tractive position, where said stabilizing wheel travels with more traction, to a less tractive position; and at lease one torsion spring having a coiled segment which is wound on said tubular head about the pivot axis, and two urging ends which are connected to opposite sides of said coiled segment, and which abut against said mount and said cantilever arm, respectively, so as to bias said stabilizing wheel downwardly, thereby restoring said stabilizing wheel from the less tractive position to the more tractive position.

2. The front wheel stabilizing device of claim 1, further comprising a support rod which is disposed between said side plates forwardly and downwardly of said axle, and which is disposed beneath said cantilever arm so as to restrain excess downward movement of said stabilizing wheel.

3. The front wheel stabilizing device of claim 1, wherein said side plates have a plurality of pairs of first mounting holes, each pair of which are aligned with each other in the transverse direction such that said support rod is disposed to extend through a selected pair of said first mounting holes so as to permit adjustment of the height of said support rod relative to said side plates.

4. The front wheel stabilizing device of claim 1, wherein said side plates have a plurality of pairs of second mounting holes, each pair of which are aligned with each other in the transverse direction such that said axle is disposed to extend through a selected pair of said second mounting holes so as to adjust the height of said axle relative to said side plates.

5. The front wheel stabilizing device of claim 1, wherein said wheel mounting member has a stem which is disposed on and which extends from said cantilever arm for abutment of said urging ends of said torsion spring there against.

6. The front wheel stabilizing device of claim 5, wherein one of said urging ends has a concave portion which is configured for mounting said stem thereon.

7. The front wheel stabilizing device of claim 1, wherein said mount further has a back plate which is interposed between and which is disposed rearwardly of said side plates, one of said urging ends of said torsion spring being disposed to abut against said back plate.

8. The front wheel stabilizing device of claim 7, further comprising a coupling member which is securely mounted on said mount and which is disposed to secure said mount to the front side of the main frame.

* * * * *